(12) United States Patent
Ketterer (10) Patent No.: US 10,491,880 B2
(45) Date of Patent: Nov. 26, 2019

(54) METHOD FOR IDENTIFYING OBJECTS, IN PARTICULAR THREE-DIMENSIONAL OBJECTS

(71) Applicant: Robert Bosch GmbH, Stuttgart (DE)

(72) Inventor: Darno Alexander Ketterer, Gerlingen (DE)

(73) Assignee: Robert Bosch GmbH, Stuttgart (DE)

(*) Notice: Subject to any disclaimer, the term of this patent is extended or adjusted under 35 U.S.C. 154(b) by 134 days.

(21) Appl. No.: 15/417,258

(22) Filed: Jan. 27, 2017

(65) Prior Publication Data

US 2017/0237966 A1 Aug. 17, 2017

(30) Foreign Application Priority Data

Jan. 29, 2016 (DE) .................. 10 2016 201 389

(51) Int. Cl.
| | |
|---|---|
| *G06T 7/00* | (2017.01) |
| *G06K 9/46* | (2006.01) |
| *G06F 17/30* | (2006.01) |
| *H04N 13/00* | (2018.01) |
| *H04N 13/204* | (2018.01) |
| *H04N 13/106* | (2018.01) |
| *H04N 13/257* | (2018.01) |
| *G06K 9/00* | (2006.01) |

(52) U.S. Cl.
CPC ............ *H04N 13/204* (2018.05); *G06T 7/00* (2013.01); *H04N 13/106* (2018.05); *H04N 13/257* (2018.05); *G06K 9/00* (2013.01)

(58) Field of Classification Search
CPC .. H04N 13/204; H04N 13/106; H04N 13/257; G06T 7/00; G06K 9/00

USPC ........................................................ 348/43
See application file for complete search history.

(56) References Cited

U.S. PATENT DOCUMENTS

| | | | | |
|---|---|---|---|---|
| 6,903,751 B2* | 6/2005 | Saund | ..................... | G06T 11/60 345/619 |
| 7,016,532 B2* | 3/2006 | Boncyk | ............. | G06F 17/30256 382/165 |
| 7,542,610 B2* | 6/2009 | Gokturk | ............ | G06F 17/30253 382/209 |
| 8,687,104 B2* | 4/2014 | Penov | ................... | G06K 9/6202 348/222.1 |
| 8,831,279 B2* | 9/2014 | Rodriguez | .............. | G06T 11/60 382/103 |
| 9,299,007 B2* | 3/2016 | Utsumi | ................ | G06K 9/6212 |
| 9,355,312 B2* | 5/2016 | Amtrup | .............. | G06K 9/00469 |
| 9,536,167 B2* | 1/2017 | Schwartz | ............ | G06K 9/00201 |
| 9,754,163 B2* | 9/2017 | Segalovitz | .......... | G06K 9/00442 |
| 2002/0102966 A1* | 8/2002 | Lev | ........................... | G09F 3/00 455/412.1 |

(Continued)

*Primary Examiner* — Susan E. Hodges (74) *Attorney, Agent, or Firm* — Maginot, Moore & Beck LLP (57) ABSTRACT

Identification of objects, in particular three dimensional objects, includes digital scanning of at least one image portion of an image of at least one object to be identified for the digital capture of points of the image. The digitally captured points of the at least one image portion of the image are combined to form an image data record, wherein multiple image data records are generated for the object to be identified, and the image data records differ from one another at least in view of at least one image portion characteristic.

18 Claims, 3 Drawing Sheets

(56) References Cited

U.S. PATENT DOCUMENTS

| | | | |
|---|---|---|---|
| 2006/0195858 A1* | 8/2006 | Takahashi | G01C 21/3602 |
| | | | 725/19 |
| 2012/0011142 A1* | 1/2012 | Baheti | G06K 9/4671 |
| | | | 707/769 |
| 2014/0119656 A1* | 5/2014 | Lilje | G06T 7/0083 |
| | | | 382/173 |
| 2014/0293383 A1* | 10/2014 | Ozawa | H04N 1/2338 |
| | | | 358/538 |
| 2015/0026785 A1* | 1/2015 | Soon-Shiong | G06Q 30/0207 |
| | | | 726/7 |
| 2016/0188941 A1* | 6/2016 | Todeschini | G06K 7/10722 |
| | | | 235/462.11 |

\* cited by examiner

METHOD FOR IDENTIFYING OBJECTS, IN PARTICULAR THREE-DIMENSIONAL OBJECTS

This application claims priority under 35 U.S.C. § 119 to application no. DE 10 2016 201 389.0, filed on Jan. 29, 2016 in Germany, the disclosure of which is incorporated herein by reference in its entirety.

BACKGROUND

Methods for identifying objects in which digital scanning of at least one image portion of an image of at least one object to be identified is carried out in at least one method step for the purposes of the digital capture of points of the image are already known.

SUMMARY

The disclosure proceeds from a method for identifying objects, in particular three-dimensional objects, in which digital scanning of at least one image portion of an image of at least one object to be identified is carried out in at least one method step for the purposes of the digital capture of points of the image.

It is proposed that the digitally captured points of the at least one image portion of the image are combined to form an image data record in at least one method step, wherein a plurality of image data records are generated for an object to be identified, said image data records differing from one another at least in view of at least one image portion characteristic, in particular in view of at least one arrangement of the image portion relative to an overall image of an object, in view of at least one alignment of the image portion, or the like. Preferably, the image data records differ at least in an image portion characteristic formed as a scanning and/or capture angle.

Advantageously, the method comprises at least one method step, in which an object, in particular a physical object, is converted into digital image of the object. Preferably, an object, in particular a physical object, is converted into a digital image of the object by means of at least one image sensor, for example by means of a CCD sensor, by means of a CMOS sensor, by means of a vidicon tube, by means of an iconoscope, by means of a nanosensor, by means of an x-ray sensor or the like. Preferably, at least one portion of an image of an object is digitized by means of at least one image sensor, with at least one image portion of the image being scanned digitally in at least one method step, in particular for the purposes of analyzing digital information items about the at least one image portion of the image. Preferably, individual points of the image are digitally captured at least substantially at the same time as the digital scanning of the at least one image portion of the image, or after the latter in time. Particularly preferably, the at least one image portion of the image is depicted in a manner visible to the operator by means of an optical output unit, in particular after digitization by means of an image sensor. The optical output unit is preferably embodied as a display, for example as an LC display, an LED display, an OLED display or the like.

Here, "digital scanning" should be understood to mean, in particular, an analysis of at least one image portion of an image, in particular of a digital image, of an object. Preferably, digital information items of the at least one image portion of the image, in particular of individual points of the at least one image portion of the image are analyzed during digital scanning of the at least one image portion of the image. Preferably, information items of the at least one image portion of the image, in particular of individual points of the at least one image portion of the image, encoded in binary are analyzed during digital scanning of the at least one image portion of the image. Advantageously, there is scanning of the at least one image portion of the image, in particular scanning for facilitating finding changes in at least one characteristic of at least two points, during digital scanning of the at least one image portion of the image.

The expression "digital capture" should in particular, define storage, in particular at least temporary storage, of at least one digital information item, in particular of at least one individual point of at least one image portion of an image of an object, on a digital storage medium and/or generation of at least one digital data string, in particular an individual digital data string, for at least one individual point of at least one image portion of an image of an object. The digital information item and/or the data stream for at least one individual point of the at least one image portion of the image may, for example, comprise at least one coordinate, at least one color value, at least one encryption value, at least one metadata value of an optical capture apparatus, in particular of the image sensor, at least one control value, at least one session ID, at least one enumeration value, at least one time value, at least one global location characteristic, at least one alignment value and/or at least one other value appearing expedient to a person skilled in the art. By way of example, the metadata value of the optical capture unit, in particular of the image sensor, may be embodied as a stop number, as an illumination time, as an ISO value or as another metadata value appearing expedient to a person skilled in the art. Particularly preferably, there is a digital capture of only individual points of the at least one image portion. Advantageously, there is digital capture of only individual points of the at least one image portion in at least one method step, wherein, in particular, a digital capture of all points of the at least one image portion of the image is prevented, in particular in the presence of a low-speed data connection between a mobile apparatus for digital capture of individual points and a data processing apparatus, in particular an external data processing apparatus, for processing captured points for the purposes of identifying an object.

By way of example, for the purposes of digitally scanning the at least one image portion and/or for digitally capturing individual points, an operator holds the mobile apparatus over an object to be identified, wherein, as a consequence of muscular movements, in particular involuntary muscular movements, of the operator, minimal movements of the mobile apparatus are caused relative to the object to be identified, leading to different scanning and/or capture angles. In particular, individual image portions of an image are stored, at least temporarily, by means of the mobile apparatus for digital scanning and/or digital capture of individual points. Advantageously, there may be a digital capture of individual points for each one of the individually generated image portions of an image which, in particular, are transferable to the data processing apparatus for evaluation purposes. It is also conceivable for a change of the scanning and/or capture angle to be controllable and/or regulable by means of the computing unit of the mobile apparatus. Preferably, the mobile apparatus comprises a movable recording lens unit comprising at least one drive for moving a lens. Further configurations and/or procedures for obtaining different image portions of an image which appear expedient to a person skilled in the art are likewise conceivable. Preferably, the image data records have at least a common subset, in particular at least a common data string, of an individual point. Using the configuration of the method according to the disclosure, very different information items may be generated advantageously from different image portions of an image within a short period of time, said information items being usable for a fast identification and/or a fast classification of objects.

Furthermore, it is proposed that the image data records are superposed in at least one method step. Preferably, each image data record defines a two-dimensional image of an image portion. Preferably, individual points are compared to one another dependent on coordinates of the points during the superposition of image data records. By means of the configuration according to the disclosure, it is possible, advantageously, to analyze striking points in more detail in order to facilitate fast identification and/or fast classification of an object.

Further, it is proposed that a new color value, in particular a "transparent" color value, is assigned to the digitally captured points of the image data records, in particular to the digitally captured points of the image data records which have a "white" color value, at least during a superposition of the image data records. In particular, mirroring surfaces of an object to be identified and/or plastic packaging, which generate light reflections, are generated as digitally captured points of the image which have a "white" color value in the case of a digital capture. In particular, new color values, in particular a "transparent" color value, are assigned to these digitally captured points prior to, or during, a superposition. By means of the configuration according to the disclosure, it is advantageously possible to remove by calculation unwanted light reflections from the digitally captured images by way of a superposition of different image data records.

Moreover, it is proposed that at least one new image portion of an image of the at least one object to be identified is calculated from the superposition of the image data records.

By means of the configuration according to the disclosure, it is possible, advantageously, to generate unique digital images of an object which are usable for fast identification and/or a fast classification of an object.

Further, it is proposed that the digital capture, at least of individual points of the image, is carried out at least dependent on a deviation of at least one characteristic of at least two points, in particular dependent on a deviation of at least one characteristic of a point captured most recently in digital fashion in relation to a characteristic of at least one point to be captured digitally. Preferably, in at least one method step, at least one digital information item and/or at least one data string for at least one individual point of at least the image portion of the image is stored, in particular stored in a text file, and transferred for processing to a data processing apparatus, in particular to an external data processing apparatus. Preferably, only one digital information item and/or one data string of a point is captured, in particular written to a text file, when a change in at least one characteristic is detected in comparison with a digital information item and/or a data string of at least one point captured previously during the course of digital capturing. Preferably, at least one coordinate and at least one digital value for the deviation of the at least one characteristic or at least one digital value of the characteristic itself is captured digitally, in particular stored and/or written to a text file, when identifying a deviation of at least one characteristic. By way of example, the digital scanning and/or the digital capture starts at a point with the coordinates (0/0) with the characteristic x, such as e.g. a "black" color value, a "dark" brightness, or the like. In particular, points scanned following the starting point are analyzed in respect of the deviation of characteristics from the characteristic x. By way of example, if a deviation from the characteristic x is identified at a point, for example with the coordinates (2/5), during digital scanning, said point is captured digitally, in particular stored and/or written to a text file, with the coordinates thereof, in this case with the coordinates (2/5) by way of example, and with the deviating characteristic y. Preferably, at least the coordinates and the at least one characteristic of a point form a digital information item and/or a data string of the point. By means of the configuration of the method according to the disclosure, a fast capture of relevant digital information items may advantageously be facilitated for the purposes of identifying and/or classifying objects. In particular, a digital capture of relevant points for the purposes of identifying an object may advantageously be facilitated within a short time interval. Advantageously, an amount of data which is usable for identifying objects may be kept small. Advantageously, a concentration of a digital capture may be directed to a presence of deviations of at least one characteristic, in particular of individual characteristics, of points of at least one image portion of an image of an object to be identified in order to advantageously facilitate a time-saving and data-amount-saving evaluation of captured data.

Further, it is proposed that individual points of the image are captured digitally, at least dependent on a deviation of at least one color value of the at least two points, in particular dependent on a deviation of at least one color value of a point captured most recently in digital fashion in relation to a color value of at least one point to be captured digitally. Preferably, a digital capture of individual points is carried out at least dependent on a deviation of at least one RGB color value of the point captured most recently in digital fashion in relation to an RGB color value of at least one point to be captured digitally. Preferably, a color tolerance measure is predeterminable. By way of example, a point with an RGB color value of between "0" and "10" may be analyzed as "black" RGB color dependent on a color tolerance measure, wherein a point with an RGB color value greater than "10" may be analyzed as "dark blue" RGB color, or the like. An application of another color tolerance measure appearing expedient to a person skilled in the art is likewise conceivable. Moreover, it is also conceivable for the color tolerance measure to be adjustable in an automatic and/or manual manner dependent on at least one ambient parameter, such as e.g. a light incidence, light intensity, or the like. There may advantageously be time-saving digital scanning and/or time-saving digital capture of individual points by means of the configuration according to the disclosure. There may advantageously be fast digital scanning of the at least one image portion of the image on the basis of at least one deviation of at least one color value. Advantageously, generating and/or processing an advantageously small amount of data may be achieved in order to obtain relevant information items within a short time interval for the purposes of identifying an object.

Moreover, it is proposed that individual points of the image are captured digitally, at least dependent on a deviation of at least one brightness value of the at least two points, in particular dependent on a deviation of at least one brightness value of a point captured most recently in digital fashion in relation to a brightness value of at least one point to be captured digitally. Preferably, a brightness tolerance measure is predeterminable. By way of example, a point with a brightness value close to a reference white may be analyzed as bright dependent on a brightness tolerance measure, wherein a point with a brightness value close to a reference black may be analyzed as dark, or the like. An application of another brightness tolerance measure appearing expedient to a person skilled in the art is likewise conceivable. Moreover, it is also conceivable for the brightness tolerance measure to be adjustable in an automatic and/or manual manner dependent on at least one ambient parameter, such as e.g. a light incidence, light intensity, or the like. There may advantageously be time-saving digital scanning and/or time-saving digital capture by means of the configuration according to the disclosure. There may advantageously be fast digital scanning of the at least one image portion of the image on the basis of at least one deviation of at least one brightness value. Advantageously, generating and/or processing an advantageously small amount of data may be achieved in order to obtain relevant information items within a short time interval for the purposes of identifying an object.

Furthermore, it is proposed that digital scanning of the image occurs along an image direction of the at least one image portion of the image in at least one method step, said image direction extending at least substantially diagonally. Here, in particular, "at least substantially diagonal" should be understood to mean a direction extending across an image portion of an image, in particular extending across the image portion from one corner of an image portion to a further corner of the image portion. Preferably, a direction with a small deviation from an image diagonal, in particular a deviation of less than 20° or a parallel offset of less than 50 mm, should be understood also to mean extending at least substantially diagonally. It is conceivable for the method to be embodied independently of the digital capture of individual points of the image at least dependent on a deviation of at least one characteristic of at least two points, in an alternative configuration. Preferably, the method in the alternative configuration, in particular in the configuration embodied independently of the digital capture of individual points of the image at least dependent on a deviation of at least one characteristic of at least two points, comprises at least one method step in which digital scanning of at least one image portion of an image of at least one object to be identified is carried out for the purposes of digital capture of points of the image, wherein digital scanning of the image occurs along an image direction of the at least one image portion of the image in at least one method step, said image direction extending at least substantially diagonally. By means of the configuration according to the disclosure, there may advantageously be digital scanning of at least one image portion of an image within a short time interval. Advantageously, a fast analysis of at least one image portion of an image may be facilitated since, in particular, a subset of an overall number of points of at least one image portion of an image, arranged in the vicinity of an image diagonal or on the image diagonal of the at least one image portion of the image, is scanned digitally.

Further, it is proposed that digital capture of individual points of the image occurs along an image direction of the at least one image portion of the image in at least one method step, said image direction extending at least substantially diagonally. It is conceivable for the method to be carried out independently of the digital capture of individual points of the image at least dependent on a deviation of at least one characteristic of at least two points in an alternative configuration. Preferably, the method in the alternative configuration, in particular in the configuration embodied independently of the digital capture of individual points of the image at least dependent on a deviation of at least one characteristic of at least two points, comprises at least one method step in which there is digital scanning of at least one image portion of an image of at least one object to be identified for the purposes of the digital capture of points of the image, wherein digital capture of individual points of the image occurs along an image direction of the at least one image portion of the image in at least one method step, said image direction extending at least substantially diagonally. By means of the configuration according to the disclosure, a large information item content may be advantageously captured within a short time interval from the at least one image portion of the image. Advantageously, a fast capture of individual points of at least one image portion of an image may be facilitated since, in particular, a subset of an overall number of points of at least one image portion of an image, arranged in the vicinity of an image diagonal or on the image diagonal of the at least one image portion of the image, is captured digitally.

Moreover, it is proposed that a grid is used in at least one method step for digital scanning of the at least one image portion of the image and/or for digital capture of individual points of the image. Here, in particular, a "grid" should be understood to mean a digital aid, in which scanning points or capture points have a predetermined distance from one another and/or a predetermined arrangement in relation to one another. Preferably, the grid has a mesh-like, in particular a polygon-mesh-like or circular-ring-mesh-like embodiment. Preferably, a pitch of the grid is modifiable. Preferably, the pitch specifies the number of scanning points or capture points in relation to a length of a path, such as e.g. a pitch of two points per centimeter (2 p/cm) or the like. Preferably, digital scanning of the at least one image portion of the image and/or digital capture of individual points is started at a corner point or a central point of the at least one image portion of the image, wherein the corner point or the central point is assigned, in particular, coordinates (0/0) of a Cartesian coordinate system, in particular of a two-dimensional Cartesian coordinate system. Preferably, there is digital scanning of the at least one image portion of the image and/or digital capture of individual points in accordance with the grid. By way of example, a point with the coordinates (0/0) is digitally scanned and/or digitally captured, wherein a grid with a pitch of e.g. 1 p/cm is used such that a next point to be scanned digitally has a distance of 1 cm from the point (0/0), in particular a radial distance proceeding from the point (0/0) in the case of a circular-ring-mesh-like configuration of the grid. Advantageously, reproducible scanning of the at least one image portion of the image may be achieved by means of the configuration according to the disclosure. Advantageously, time-saving digital scanning of the at least one image portion of the image and/or time-saving digital capture of individual points may be achieved.

Moreover, it is proposed that at least one characteristic of the grid is modified dependent on at least one characteristic of the at least one image portion of the image. It is conceivable for the method to be embodied independently of the digital capture of individual points of the image at least dependent on a deviation of at least one characteristic of at least two points in an alternative configuration. Preferably, the method in the alternative configuration, in particular in the configuration embodied independently of the digital capture of individual points of the image at least dependent on a deviation of at least one characteristic of at least two points, comprises at least one method step in which there is digital scanning of at least one image portion of an image of at least one object to be identified for the purposes of a digital capture of point of the image, wherein, in at least one method step, a grid is used for digital scanning of the at least one image portion of the image and/or for digital capture of individual points of the image and at least one characteristic of the grid is modified dependent on at least one characteristic of the at least one image portion of the image. The at least one characteristic of the grid is preferably embodied as pitch of the grid. However, it is also conceivable for the at least one characteristic of the grid to be embodied as a different characteristic of the grid appearing expedient to a person skilled in the art, such as e.g. a grid type (square-like grid, web-like grid, circular-ring-like grid, point-like grid or the like) of the grid, or the like. The at least one characteristic of the at least one image portion of the image may be embodied as an arrangement of objects in the image portion (foreground, background, or the like), as location characteristic of the image portion (e.g. as coordinate of a scanning point/capture point in the image portion), as an operator selection of a region of the image portion or as a different characteristic of the at least one image portion of the image appearing expedient to a person skilled in the art. Preferably, the grid is modified dynamically, in particular dependent on a location characteristic of the image portion, such as e.g. dependent on coordinates of a scanning point and/or capture point within the at least one image portion of the image, during digital scanning of the at least one image portion of the image and/or during digital capture of individual points. Advantageously, fast digital scanning of the at least one image portion of the image may be facilitated by means of the configuration according to the disclosure. Different regions of the at least one image portion of the image may be digitally scanned with different grids in order to facilitate an advantageous digital capture of relevant points within a short time interval.

Further, it is proposed that a pitch of the grid in a vicinity of the central point of the at least one image portion of the image is narrower than in an edge region of the at least one image portion of the image. Preferably, the central point of the at least one image portion of the image is embodied as geometric central point of the at least one image portion of the image. The term "vicinity" should in this case, in particular, be understood to mean a set of points surrounding a point, a unit and/or an element, wherein a point of the set of points at the greatest distance from the point, the unit and/or the element has a maximum distance from the unit and/or from the element of, in particular, less than 30 mm, preferably less than 20 mm and particularly preferably less than 10 mm. Here, in particular, an "edge region" should be understood to mean a region of the at least one image portion of the image which has a maximum distance of in particular less than 50 mm, preferably less than 40 mm and particularly preferably less than 20 mm from an edge delimiting the at least one image portion of the image. By means of the configuration according to the disclosure, a large amount of information may advantageously be captured digitally in the vicinity of a central point of the at least one image portion of the image, said amount of information being evaluable for the purposes of identifying an object, in particular wherein a smaller number of relevant information items is to be expected in the edge region of the at least one image portion of the image. It is possible to advantageously achieve fast and informative digital scanning and/or fast and informative digital capture of individual points in the vicinity of the central point of the at least one image portion of the image, said individual points very probably being very meaningful in relation to an object to be identified.

Moreover, it is proposed that there is a digital capture of points with a smaller deviation from at least one characteristic in a vicinity of a central point of the at least one image portion of the image than in an edge region of the at least one image portion of the image. Preferably, a tolerance field of a deviation of at least one characteristic in a vicinity of a central point of the at least one image portion of the image is smaller than in an edge region of the at least one image portion of the image. By way of example, a point in an edge region of the at least one image portion of the image, said point having a characteristic embodied as an RGB color value which has a value between "0" and "10", is analyzed as a "black" RGB color, with a further point in the vicinity of a central point of the at least one image portion of the image, said further point having a characteristic embodied as an RGB color value which has a value greater than "5", being analyzed as "dark blue". Other tolerance fields of a deviation and/or characteristics other than a color value which may be taken into account during a digital capture are likewise conceivable. Preferably, at least one characteristic of a grid is modified dependent on at least one database characteristic of digital images of objects which are stored in a memory unit. By way of example, the database characteristic may be an occurrence probability of a characteristic in at least one region of digital images of objects stored in the memory unit, an arrangement of colors in individual regions of digital images of objects stored in the memory unit, an arrangement of text in individual regions of digital images of objects stored in the memory unit, an arrangement of a machine-readable character code in individual regions of digital images of objects stored in the memory unit or another characteristic appearing expedient to a person skilled in the art. By way of example, a probability of a deviation from characteristics in the vicinity of a central point of an image stored in the memory unit is small such that, for example, a pitch of a grid is set to be wider in the vicinity of a central point of at least one image portion of an image of an object to be scanned than in an edge region of the at least one image portion of the image to be scanned. Moreover, it is also conceivable, for example, that an occurrence probability for a characteristic embodied as a color value with a value for "gray" is low in the vicinity of a central point of an image stored in a memory unit, and so digital scanning of at least one image portion of an image of an object to be scanned is prioritized for points with a "gray" color value in the vicinity of the central point in order to facilitate a fast reduction of possible hits or a fast assignment to an image of a stored object which is stored in the memory unit, for the purposes of identifying an object. Advantageously, focusing an information item capture dependent on a capture location may be facilitated by means of the configuration according to the disclosure. Advantageously, a large number of relevant points can be captured quickly. Advantageously, a dynamic change of a grid for digital scanning of at least one image portion of an image of an object and/or for digital capture of individual points of the at least one image portion may be achieved in order, advantageously, to facilitate a fast identification and/or classification of an object.

Moreover, it is proposed that a dimension and/or an arrangement of the at least one image portion of the image to be scanned digitally are/is predetermined by an operator in at least one method step. Particularly preferably, a variable and/or an arrangement of the at least one image portion of the image to be scanned are/is predetermined by an operator by means of a touch-sensitive optical output unit, in particular after digitization by means of an image sensor. By way of example, an operator may prescribe that digital scanning of an image only takes place in at least one image portion of the image having text. Furthermore, it is conceivable, for example, for an operator to adapt the size of a scanning window to the size of writing arranged on an object, graphics arranged on an object, or the like. Further prescriptions of the size and/or arrangement of the at least one image portion of the image to be scanned which appear expedient to a person skilled in the art are likewise conceivable. Advantageously, an operator input may be taken into account by means of the configuration according to the disclosure for the purposes of a fast identification and/or classification of an object. A region of the image appearing relevant from the view of the operator may advantageously be selected by an operator in order to facilitate a reliable identification and/or classification of an object. Advantageously, a reduction in the digital scanning computational outlay caused by the operator input and/or reduction in the digital capture outlay caused by the operator input, for example as a consequence of selecting a small image portion of an image of an object, may be achieved.

Further, it is proposed that at least one global location characteristic and/or at least one weather characteristic is/are taken into account in at least one method step during a comparison of digitally captured points of the image with data of images of objects stored in a memory unit. The global location characteristic may be embodied as a compass characteristic, a Galileo location characteristic, a GLONASS location characteristic, a Beidou location characteristic, a GPS location characteristic, or the like. The weather characteristic may be embodied as an air-pressure characteristic, a precipitation characteristic, a number-of-sun-hours characteristic, a strength-of-wind characteristic, or the like. By way of example, it is conceivable that a location characteristic embodied as a GPS location characteristic is taken into account when comparing digitally captured points of the image with data of images of objects stored in a memory unit for the purposes of facilitating an assignment of an object identification to a business X, for example a carpenter's workshop, wherein the assignment is usable for identifying an object since, for example, a carpenter's workshop will, with a high probability, wish to identify an object for wood processing or an object made of a wood material. Preferably, there may be a restriction of possible objects stored in the memory unit on the basis of these additional information items in order to facilitate a fast identification and/or fast classification. Moreover, it is also conceivable that the at least one global location characteristic and/or the at least one weather characteristic are/is taken into account during digital scanning and/or digital capture in at least one method step. By way of example, during digital scanning and/or digital capture in the case of a weather characteristic embodied as a precipitation characteristic, it is possible to take into account that a image of an object to be scanned may have points which, for example, have images of water droplets, wherein these points are preferably excludable from digital scanning and/or from digital capture or are digitally processable after digital scanning and/or after digital capture. Advantageously, further characteristics, which contribute to a fast identification and/or fast classification of an object, may be taken into account by means of the configuration according to the disclosure. Advantageously, additional information items after a successful identification and/or a successful classification of an object may be output to an operator dependent on at least one global location characteristic which was taken into account and/or at least one weather characteristic which was taken into account.

Moreover, it is proposed that an operator input in respect of a type of object to be identified is taken into account in at least one method step. Preferably, there is a preselection of a type of an object to be identified in at least one method step, in particular prior to digital scanning of at least one image portion of an image of an object and/or prior to a digital capture of individual points of the image. By way of example, an operator specifies, in at least one method step, that an object to be identified is a hand-held power tool, a refrigerator, a car, a clock, a vacuum cleaner, a gardening machine or the like, with this operator input being taken into account during digital scanning of at least an image portion of an image of an object and/or prior to a digital capture of individual points of the image. Advantageously, a restriction of possible objects may already take place in an early method step. Advantageously, a fast identification and/or fast classification of an object may be facilitated.

Moreover, it is proposed that digital scanning of the at least one image portion of the image is carried out by means of mobile apparatus which, for the purposes of transferring digital data, is connected to an external data processing apparatus. The mobile apparatus may be embodied as a portable telephone, in particular as a smartphone, as a tablet, as a laptop, as an notebook, as a phablet, as a personal computer (PC), as a mobile robot, as data glasses, as a computer which may be integrated into a piece of clothing, as an autonomous implement, as a hand-held scanner or as any other mobile apparatus appearing expedient to a person skilled in the art. Preferably, the mobile apparatus comprises at least one image sensor for digitizing at least one image portion of an image of an object. Preferably, the mobile apparatus comprises at least one optical output unit for displaying the at least one image portion of the image. The mobile apparatus is preferably provided to be connected wirelessly to an external data processing apparatus for the purposes of transferring digital data. However, it is also conceivable for the mobile apparatus to be connected, alternatively or additionally, to the external data processing apparatus by means of wires for the purposes of transferring digital data. It is further conceivable for the mobile apparatus and the data processing apparatus to be arranged in a common apparatus, for example an apparatus embodied as a car, as a truck, as an autonomous robot or the like, and to communicate with one another by means of a wireless and/or wired data connection. Preferably, the mobile apparatus is provided for digital scanning, a digital capture and/or a transfer, wherein the external data processing apparatus is preferably provided for further processing, in particular for a comparison and/or an evaluation. However, it is also conceivable that the mobile apparatus is provided for digital scanning, digital scanning for a comparison and/or for an evaluation of data. In particular, "provided" should be understood to mean specifically configured, specifically equipped and/or specifically programmed. An element, a unit and/or an apparatus being provided for specific function should, in particular, be understood to mean that the element, the unit and/or the apparatus fulfill/fulfills and/or carry/carries out this specific function in at least one application and/or operating state. There may advantageously be digital scanning and/or digital capture of points for the purposes of identifying an object in a location-independent manner by means of the configuration according to the disclosure.

Furthermore, it is proposed that an acceleration characteristic and/or an alignment characteristic of the mobile apparatus are/is taken into account in at least one method step. It is conceivable that, alternatively or additionally, at least one further characteristic of the mobile apparatus is taken into account, such as e.g. a radar characteristic, an infrared characteristic, a sonar characteristic, a laser characteristic, a ranging characteristic, a time-of-flight-measurement characteristic or the like. By means of the configuration according to the disclosure, at least one characteristic of the mobile apparatus may be advantageously evaluated for a fast identification and/or fast classification of at least one object. By way of example, a movement of the mobile apparatus relative to an object to be identified may advantageously be evaluated as a consequence of taking into account an acceleration characteristic, wherein, in particular, digital scanning of different image portions of an image of an object is realizable. By way of example, an alignment characteristic of the mobile apparatus may advantageously be taken into account in order to advantageously facilitate digital scanning and/or digital capture from different angles.

Moreover, it is proposed that there is preprocessing of the at least one image portion of the image by means of a computing unit of the mobile apparatus. Here, in particular, the term "preprocessing" should define carrying out at least one method step, in particular digital scanning, a digital capture, digital processing or the like, prior to a further method step, in particular prior to a transfer of digital data from the mobile apparatus to the data processing apparatus, an evaluation of transmitted digital data by means of the data processing apparatus, or the like. Preferably, the at least one image portion of the image is preprocessed in the form of digital scanning of the at least one image portion of the image and/or in the form of a digital capture of individual points of the image by means of the computing unit of the mobile apparatus. By means of the configuration according to the disclosure, there may advantageously be processing of digital data for further processing in an earlier method step. Preferably, less computational power is sufficient for preprocessing such that a cost effective mobile apparatus is usable for carrying out preprocessing. Advantageously, there may be a digitization of at least one image portion of an image into a data format expedient for further processing.

Moreover, it is proposed that instructions are output to an operator in at least one method step, said instructions at least comprising movement instructions for moving a mobile apparatus provided for capturing digital points of the image, relative to the object to be identified. By way of example, it is conceivable that there is an output to an operator to carry out a movement of the mobile apparatus around the object to be identified in order, in particular, to identify text extending around the object or in order to identify the shape of the object. Moreover, it is conceivable, for example, that there is an output to an operator to carry out a movement of the mobile apparatus, relative to the object to be identified, along a longitudinal axis of the object to be identified in order to identify a maximum dimension. Further, it is for example conceivable that there is an output to an operator to carry out a movement of the mobile apparatus, relative to the object to be identified, along a direction extending at least substantially across a longitudinal axis of the object to be identified in order to generate a depth information item in respect of the object to be identified. Further outputs, appearing expedient to a person skilled in the art, to an operator to move the mobile apparatus relative to the object to be identified are likewise conceivable. Advantageously, there may be expedient digital scanning of an object to be identified by means of the configuration according to the disclosure. Advantageously, an operator assistance may be realized in order to facilitate reliable digital scanning of the object to be identified. A fast identification and/or fast classification of an object may advantageously be facilitated by means of the operating instructions because relevant regions of an object to be identified are digitally analyzable and/or digitally capturable in a targeted manner.

Further, the disclosure proceeds from a system for identifying objects, in particular three-dimensional objects, comprising at least one mobile apparatus for digital scanning of at least one image portion of an image of at least one object to be identified, for the purposes of a digital capture of points of the image, in particular by means of a method according to the disclosure, and comprising at least one external data processing apparatus, provided for communication with at least the mobile apparatus. It is proposed that the mobile apparatus comprises at least one collective logic, at least for digital capture of individual points, and the external data processing apparatus has an object identification function which processes the digitally captured points. This may advantageously facilitate that the mobile apparatus requires a low computational power for digital scanning and/or for digital capture and computing processes which prefer a high computational power are carried out by means of the computing unit of the data processing apparatus.

Moreover, it is proposed that the mobile apparatus comprises at least one alignment sensor and/or acceleration sensor, the captured data of which are processable by the external data processing apparatus for the purposes of identifying the object. Preferably, the mobile apparatus comprises at least one further sensor, appearing expedient to a person skilled in the art, for capturing data which are processable by the external data processing apparatus for the purposes of identifying the object. By way of example, the at least one further sensor may be a depth sensor, a radar sensor, a sonar sensor, an infrared sensor or the like. Preferably, the mobile apparatus comprises at least one evaluation unit for evaluating the data captured by means of the alignment sensor, the acceleration sensor and/or the further sensor. Preferably, the mobile apparatus comprises at least one light-generating unit, in particular a flash-light unit such as e.g. an LED flash-light unit. By way of example, it is conceivable that at least one depth information item of portions of an object is generable by an evaluation of a time-of-flight of light pulses of the flash-light unit. Further evaluations, appearing expedient to a person skilled in the art, of data captured by means of the alignment sensor, the acceleration sensor and/or the further sensor for the purposes of generating information items which are usable during an identification and/or classification are likewise conceivable. Advantageously, information items for a fast identification and/or classification of an object by means of an evaluation of sensor data of the mobile apparatus may be generated by means of the configuration according to the disclosure.

Furthermore, it is proposed that the mobile apparatus comprises a touch-sensitive input unit for the purposes of selecting the at least one image portion of the image by an operator, said input unit having a selection mask for selecting the at least one image portion of the image, the size of which is modifiable by means of at least one finger of the operator. The touch-sensitive input unit is preferably embodied as a touch-sensitive display of the mobile apparatus. By way of example, the touch-sensitive input unit may be embodied as an LC display, as an LED display, as an OLED display or the like. Advantageously, a simple operability of the mobile apparatus for the purposes of a fast identification and/or a fast classification of an object may be facilitated by means of the configuration according to the disclosure.

Moreover, it is proposed that the data processing apparatus is embodied as a server or as a cloud. Advantageously, computational processes for identifying and/or classifying an object which prefer high computational power may advantageously be swapped in order to facilitate a fast identification and/or fast classification of an object.

The method according to the disclosure and/or the system according to the disclosure should in this case not be restricted to the above-described application and embodiment. In particular, the method according to the disclosure and/or the system according to the disclosure may have a number of individual elements, components and units and method steps which deviates from the number specified herein for the purposes of fulfilling a functionality described herein. Moreover, values lying within the stated boundaries of value ranges specified in this disclosure should also be considered to be disclosed and usable as desired.

BRIEF DESCRIPTION OF THE DRAWINGS

Further advantages emerge from the following description of the figures. The drawing depicts one exemplary embodiment of the disclosure. The drawing and the description contain several features in combination. Expediently, a person skilled in the art will also consider the features individually and combine these to form expedient further combinations.

In the drawings.

DETAILED DESCRIPTION

Figure 1:
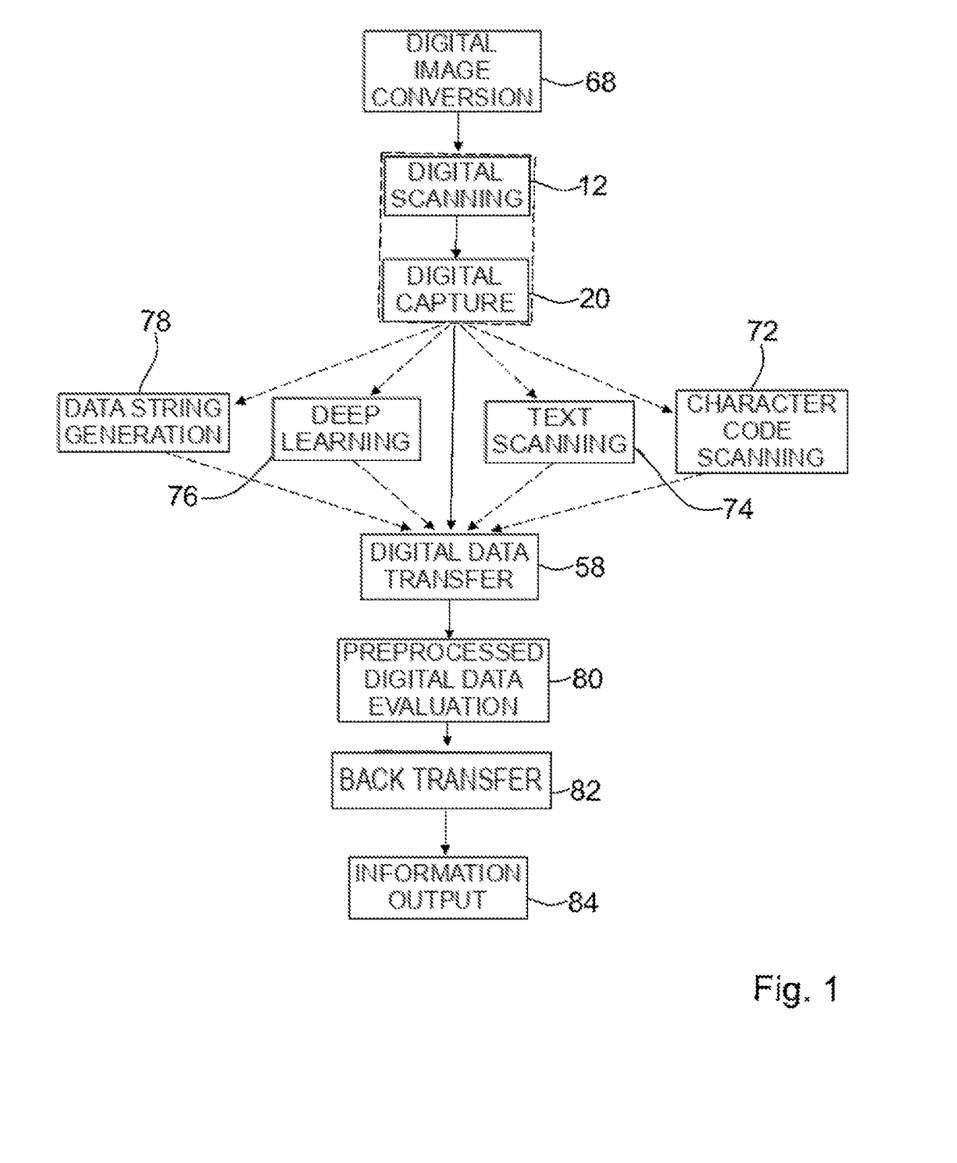
FIG. 1 shows a procedure of a method according to the disclosure, in a schematic illustration.

FIG. 1 shows a schematic procedure of a method for identifying objects 10 (FIG. 2), in particular three-dimensional objects 10. An object 10 to be identified may have any configuration, for example a configuration as a traffic sign, as an information board, as a household appliance, as a garden appliance, as a movement appliance, as a recreational appliance, as a piece of clothing, as a piece of jewelry, as a machine tool, as a hand-held power tool, as a machine tool accessory, as a hand-held power tool accessory, as a car, as a truck, as an entertainment electronics appliance, as an electronics accessory, as an electronic data processing appliance, as an electronic data processing accessory, as a literature object, as an art object and/or as another object appearing expedient to a person skilled in the art. In the further description of the method and of a system, by means of which the method is performable, the object 10 is embodied as a hand-held power tool in an exemplary manner. The functionality of the method and of the system should not, however, be restricted to identifying an object 10 embodied as a hand-held power tool.

Figure 2:
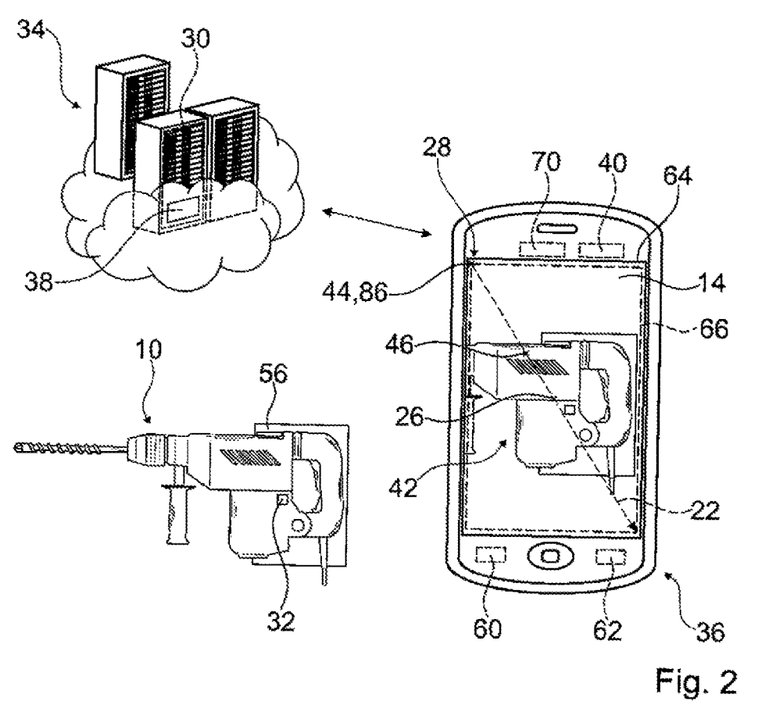
FIG. 2 shows a system according to the disclosure for identifying objects, in a schematic illustration.

FIG. 2 shows a system for identifying objects 10, in particular three-dimensional objects 10. The system comprises at least one mobile apparatus 36 for digital scanning 12 of at least one image portion 14, 16, 18 of an image 42 of at least the object 10 to be identified for the purposes of a digital capture 20 of points 44, 46 of the image 42. Further, the system comprises at least one data processing apparatus 34, in particular an external data processing apparatus 34, which is provided to communicate, at least, by means of the mobile apparatus 36. Preferably, the digital scanning 12 of the at least one image portion 14, 16, 18 of the image 42 is carried out by means of the mobile apparatus 36, which is connected to the data processing apparatus 34, in particular to the external data processing apparatus 34, for transferring 58 digital data. The mobile apparatus 36 has at least a collective logic at least for digital capture 20 of individual points 44, 46 and the external data processing apparatus 34 has an object identification function which processes the digitally captured points 44, 46. Comparing and/or matching transferred data with data of images of objects 10 stored in a memory unit 30 of the data processing apparatus 34 and/or with data which may be accessed by the data processing apparatus 34, for example by means of a network connection, in particular an Internet connection, is carried out by means of at least one computing unit 38 of the data processing apparatus 34. Digital scanning 12 of the at least one image portion 14, 16, 18 of the image 42 of the at least one object 10 to be identified and/or the digital capture 20 of individual points 44, 46 of the image 42 by means of the mobile apparatus 36 is influenced, at least in part, by the computing unit 38 of the data processing apparatus 34. It is conceivable that the data processing apparatus 34 generates scanning commands and/or capture commands on the basis of stored data, said commands being transferred to the mobile apparatus 36. By way of example, it is conceivable that the digital scanning 12 and/or the digital capture 20 only takes/takes place in edge regions 28 of the at least one image portion 14, 16, 18 dependent on the scanning commands and/or the capture commands because, for example, an evaluation of data stored in a memory unit 30 of the data processing apparatus 34 has yielded that the edge regions 28 of the at least one image portion 14, 16, 18 of the image 42 are relevant for identifying the object 10. The data processing apparatus 34 is embodied as a server or as a cloud. However, it is also conceivable that the data processing apparatus 34 has a different configuration appearing expedient to a person skilled in the art. In at least one method step of the method, use is made of at least one aid 56, which is standardized or normalized in respect of the dimensions thereof, for capturing at least one spatial dimension of the object 10 to be identified. The standardized or normalized aid 56 may be embodied as millimeter paper, as a DIN sheet, as a grid sheet or as a different standardized or normalized aid appearing expedient to a person skilled in the art. The standardized or normalized aid 56 is preferably arranged below or next to the object 10 to be identified. In particular, the at least one standardized or normalized aid 56 is digitized together with the object 10 to be identified by way of the mobile apparatus 36. An identification of objects 10 by means of the system is preferably carried out by means of a method in accordance with the further description.

In at least one method step of the method, there is a conversion 68 of the object 10, in particular the physical object, into a digital image 42 of the object 10. Preferably, a conversion 68 of the object 10, in particular the physical object, into digital image 42 of the object 10 is carried out by means of at least one image sensor 70 (FIG. 2). The image sensor 70 may be embodied as a CCD sensor, as a CMOS sensor, as a vidicon tube, as an iconoscope, as a nanosensor, as an x-ray sensor or the like. In particular, the image sensor 70 is arranged in the mobile apparatus 36 (FIG.

2). The mobile apparatus 36 preferably comprises the image sensor 70. The mobile apparatus 36 is preferably embodied as a smartphone. However, it is also conceivable that the image sensor 70 is arranged in another apparatus appearing expedient to a person skilled in the art, such as e.g. a fixedly installed camera, a car, an access control apparatus or the like. Preferably, at least one portion of an image 42 of the object 10 is digitized by means of the image sensor 70 in at least one method step of the method. The digital scanning 12 of the at least one image portion 14, 16, 18 of the image 42 of the object 10 to be identified, for the purposes of a digital capture 20 of points 44, 46 of the image 42 is carried out in at least one method step of the method. Digital scanning 12 is preferably provided to analyze digital information items of the at least one image portion 16, 16, 18 of the image 42. Preferably, the digital capture 20 of individual points 44, 46 of the image 42 takes place at least substantially at the same time as or later in time than the digital scanning 12 of the at least one image portion 14, 16, 18 of the image 42 in at least one method step of the method. Particularly preferably, the at least one image portion 14, 16, 18 of the image 42 is displayed in a manner visible to the operator by means of an optical output unit, in particular after the conversion 68, in particular a digitization. The optical output unit preferably has an integral embodiment with a touch-sensitive input unit 64 of the mobile apparatus 36 (FIG. 2). The touch-sensitive input unit 64 of the mobile apparatus 36 is embodied as a touch-sensitive display, such as e.g. a touch-sensitive LC display, as a touch-sensitive LED display, as a touch-sensitive OLED display, or the like.

In at least one method step of the method there is a one-to-one comparison of digital information items of the at least one image portion 16, 16, 18 of the image 42, in particular a one-to-one comparison of the at least one image portion 16, 16, 18 of the image 42 or of the entire image 42, with images stored in the memory unit 30 of the data processing apparatus 34 and/or images to which the data processing apparatus 34 has access as a consequence of a data connection, such as e.g. images of objects 10 which may be found on the Internet, or the like. The images stored in the memory unit 30 of the data processing apparatus 34 may be e.g. 3D-CAD data, digital photos, digital videos or the like. If a correspondence of the digitally captured image 42 with at least one image stored in memory unit 30 of the data processing apparatus 34 as a result of the one-to-one comparison emerges, the method is terminated and an operator is presented with a result. If no correspondence emerges, further method steps of the method of preferably run through.

Preferably, there is preprocessing of the at least one image portion 14, 16, 18 of the image 42 by means of a computing unit 40 of the mobile apparatus 36 in at least one method step of the method. Preferably, there is character code scanning 72 of the at least one image portion 14, 16, 18 of the image 42 in respect of the presence of at least one machine-readable character code 32, in particular a QR code, barcode or the like, in particular simultaneously with the digital scanning 12 and/or the digital capture 20 or with time offset from the digital scanning 12 and/or the digital capture 20, in at least one method step of the method. Preferably, there is text scanning 74 of the at least one image portion 14, 16, 18 of the image 42 in respect of the presence of text, in particular simultaneously with the digital scanning 12 and/or the digital capture 20 or with time offset from the digital scanning 12 and/or the digital capture 20, in at least one method step of the method. Preferably, there is deep-learning data structuring 76 of the at least one image portion 14, 16, 18 of the image 42 in at least one method step of the method in order, for example, to identify more quickly the at least one image portion 14, 16, 18 of the image 42 in the case of a subsequent query, or the like. In particular, deep-learning data structuring 76 of the at least one image portion 14, 16, 18 of the image 42 is carried out simultaneously with the digital scanning 12 and/or with the digital capture 20, or with time offset from the digital scanning 12 and/or the digital capture 20. Preferably, the method has at least one self-learning function which is based on a manual operator confirmation and/or an adaptation of the operator behavior. The self-learning function preferably comprises the use of a neural network. Preferably, whether an identification of an object 10 was correct or incorrect is learned on the basis of a manual operator confirmation. An evaluation of a probability, for example a similarity factor or the like, is also conceivable. Preferably, a preferred procedure of individual operators is learned, in particular on the basis of an adaptation of an operator behavior. Further configurations of the self-learning function which appear expedient to a person skilled in the art are also conceivable.

Preferably, there is data string generation 78 of individual points 44, 46 of the at least one image portion 14, 16, 18 of the image 42, in particular as a consequence of the digital capture 20, in at least one method step of the method. By way of example, a data string for at least one individual point 44, 46 of the at least one image portion 14, 16, 18 of the image 42 may comprise at least one coordinate, at least one color value, at least one encryption value, at least one metadata value of an optical capture apparatus, in particular of the image sensor 70, at least one control value, at least one session ID, at least one enumeration value, at least one time value, at least one global location characteristic, at least one alignment value and/or at least one other value appearing expedient to a person skilled in the art.

Preferably, there is a transfer 58 of digital data from the mobile apparatus 36 to a data processing apparatus 34, in particular to an external data processing apparatus 34 (FIG. 2), in at least one method step of the method. The preprocessing of the at least one image portion 14, 16, 18 of the image 42 is carried out at least before the transfer 58 of digital data of the at least one image portion 14, 16, 18 of the image 42 to the external data processing apparatus 34. During preprocessing by means of the computing unit 40 of the mobile apparatus 36, at least individual points 44, 46 of the image 42 are preferably analyzed digitally and individual data strings for the individual points 44, 46 are preferably generated, in particular before at least the individual points 44, 46 are transferred to the data processing apparatus 34, in particular for evaluation purposes.

Digital data preprocessed by the mobile apparatus 36, in particular, are transferred to the data processing apparatus 34 during the transfer 58 of digital data. The preprocessed digital data are evaluated by the data processing apparatus 34 in at least one method step of the method. There is an evaluation 80 of preprocessed digital data by the data processing apparatus 34 in at least one method step of the method. The data processing apparatus 34 is preferably provided to match the preprocessed digital data with data stored in the memory unit 30 of the data processing apparatus 34 or data to which the data processing apparatus 34 has access as a consequence of a data connection, such as e.g. data which may be found on the Internet, or the like. Preferably, there is a back transfer 82 of digital data from the data processing apparatus 34 to the mobile apparatus 36 in at least one method step of the method. In at least one method step of the method, there is an information output 84 by the mobile apparatus 36 dependent on a content of the digital data transferred by means of the back transfer 82.

The digital capture 20 at least of individual points 44, 46 of the image 42 is carried out at least dependent on a deviation of at least one characteristic of at least two points 44, 46, in particular dependent on a deviation of at least one characteristic of a point 44 captured most recently in digital fashion in relation to a characteristic of at least one point 46 to be captured digitally. Preferably, at least one digital information item and/or at least one data string for at least one individual point 44, 46 of the at least one image portion 14, 16, 18 of the image 42 is stored, in particular stored in a text file, during the digital capture 20. Preferably, a digital information item and/or a data string of a point 46 is only captured, in particular written to a text file, when a change of at least one characteristic in relation to a characteristic occurring in a digital information item and/or in a data string of at least one point 44 captured previously was determined during digital scanning 12. Preferably, at least one coordinate of the point 46 and at least one digital value for the deviation of the at least one characteristic or a digital value of the characteristic itself is captured digitally, in particular stored and/or written to a text file, when identifying a deviation of at least one characteristic. The digital capture 20 of individual points 44, 46 of the image 42 is preferably carried out at least dependent on a deviation of at least one color value of the at least two points 44, 46. Alternatively or additionally, it is conceivable that the digital capture 20 of individual points 44, 46 of the image 42 is carried out at least dependent on a deviation of at least one brightness value of the at least two points 44, 46. By way of example, the digital scanning 12 and/or the digital capture 20 is started at a point 44 with the coordinates (0/0) with the characteristic x, such as e.g. a "black" color value, a "dark" brightness or the like. In particular, points 46 scanned following the point 44 are analyzed in respect of a deviation of characteristics from the characteristic x. By way of example, if a deviation from the characteristics x is identified at a point 46, for example with the coordinates (4/7), during the digital scanning 12, this point 46 is captured digitally, in particular stored and/or written to a text file, with the coordinates thereof, here the coordinates (4/7) in an exemplary manner, and the deviating characteristic y. Preferably, at least the coordinates and the at least one characteristic of a point 44, 46 form a digital information item and/or a data string of the point 44, 46. The digital information item and/or the data string for at least one individual point 44, 46 of the at least one image portion 14, 16, 18 of the image 42 may, for example, comprise at least one coordinate, at least one color value, at least one encryption value, at least one metadata value of an optical capture apparatus, in particular of the image sensor 70, at least one control value, at least one session ID, at least one enumeration value, at least one time value, at least one global location characteristic, at least one alignment value and/or at least one other value appearing expedient to a person skilled in the art.

Figure 3:
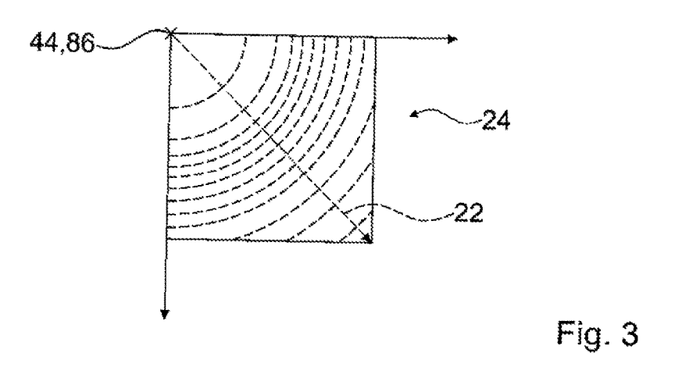
FIG. 3 shows a configuration of a grid for digital scanning of at least one image portion of an image for identifying objects by means of a method according to the disclosure, in a schematic illustration.

Digital scanning 12 of the image 42 occurs along an image direction 22 of the at least one image portion 14, 16, 18 of the image 42 in at least one method step of the method, said image direction extending at least substantially diagonally (FIGS. 2 and 3). A corner 86 of the at least one image portion 14, 16, 18 of the image 42 is set as a starting point for the digital scanning 12 and/or the digital capture 20 in at least one method step of the method. It is, however, also conceivable that a central point 26 of the at least one image portion 14, 16, 18 of the image 42 or another point appearing expedient to a person skilled in the art, said point, in particular, being arranged on the diagonal of the at least one image portion 14, 16, 18 of the image 42, is set as a starting point for the digital scanning 12 and/or the digital capture 20. The corner 86 preferably forms a coordinate origin of a two-dimensional Cartesian coordinate system, which is used for assigning a location to individual points 44, 46 of the at least one image portion 14, 16, 18 of the image 42 (FIGS. 2 and 3). The digital capture 20 of individual points 44, 46 of the image 42 occurs along the image direction 22 of the at least one image portion 14, 16, 18 of the image 42 in at least one method step of the method, said image direction extending at least substantially diagonally (FIGS. 2 and 3). Preferably, the image direction 22 extending at least substantially diagonally of the at least one image portion 14, 16, 18 of the image 42 forms an image diagonal of the at least one image portion 14, 16, 18 of the image 42.

A grid 24 is used in at least one method step of the method for digital scanning 12 of the at least one image portion 14, 16, 18 of the image 42 and/or for digital capture 20 of individual points 44, 46 of the image 42. Preferably, the digital scanning 12 of the at least one image portion 14, 16, 18 of the image 42 and/or the digital capture 20 of individual points 44, 46 is carried out in accordance with the grid 24. The grid 24 preferably has a mesh-like, in particular a circular-ring-mesh-like embodiment, with the corner 86 or the central point 26 being used as a starting point of the grid 24 for digital scanning 12 and/or for digital capture 20 and the digital scanning 12 and/or the digital capture 20 being carried out along the image direction 22 extending at least substantially diagonally, in accordance with a pitch of the grid 24 (FIGS. 2 and 3). By way of example, a point 44 with the coordinates (0/0) is set as a starting point for the digital scanning 12 and/or the digital capture 20, with use being made of a grid 24 with a pitch of e.g. 1 p/cm such that a next point 46 to be scanned in digital fashion, proceeding from the point (0/0) in the case of a circular-ring-mesh-like configuration of the grid 24, has a distance, in particular a radial distance, of 1 cm from the point (0/0). Preferably, at least one characteristic of a grid 24 is modified dependent on at least one characteristic of the at least one image portion 14, 16, 18 of the image 42. The at least one characteristic of the grid 24 is preferably embodied as pitch of the grid 24. However, it is also conceivable that the at least one characteristic of the grid 24 is embodied as another characteristic of the grid 24 appearing expedient to a person skilled in the art such as e.g. a grid type (square-like grid, web-like grid, circular-ring-like grid, point-like grid or the like) of the grid 24, or the like. The at least one characteristic of the at least one image portion 14, 16, 18 of the image 42 may be embodied as an arrangement of objects 10 in the image portion 14, 16, 18 (foreground, background, or the like), as location characteristic of the image portion 14, 16, 18 (e.g. as coordinate of a scanning point/capture point in the image portion 14, 16, 18), as an operator selection of a region of the image portion 14, 16, 18 or as a different characteristic of the at least one image portion 14, 16, 18 of the image 42 appearing expedient to a person skilled in the art. Preferably, the grid 24 is modified dynamically, in particular dependent on a location characteristic of the image portion 14, 16, 18, such as e.g. dependent on coordinates of a scanning point and/or capture point within the at least one image portion 14, 16, 18 of the image 42, during digital scanning 12 of the at least one image portion 14, 16, 18 of the image 42 and/or during digital capture 20 of individual points 44, 46. A pitch of the grid 24 in a vicinity of the central point 26 of the at least one image portion 14, 16, 18 of the image 42 is narrower than in an edge region 28 of the at least one image portion 14, 16, 18 of the image 42. There is the digital capture 20 of points 44, 46 with a smaller deviation from at least one characteristic in a vicinity of the central point 26 of the at least one image portion 14, 16, 18 of the image 42 than in an edge region 28 of the at least one image portion 14, 16, 18 of the image 42. Preferably, a tolerance field of a deviation of at least one characteristic in a vicinity of the central point 26 of the at least one image portion 14, 16, 18 of the image 42 is smaller than in the edge region 28 of the at least one image portion 14, 16, 18 of the image 42. By way of example, a point 44 in an edge region 28 of the at least one image portion 14, 16, 18 of the image 42, said point having a characteristic embodied as an RGB color value which has a value between "0" and "10", is captured as a "black" RGB color by the mobile apparatus 36, in particular by the digital scanning 12, with a further point 46 in the vicinity of the central point 26 of the at least one image portion 14, 16, 18 of the image 42, said further point having a characteristic embodied as an RGB color value which has a value greater than "5", being captured as "dark blue".

At least one characteristic of the grid 24 is modified dependent on at least one database characteristic of digital images of objects 10 which are stored in the memory unit 30 or to which the data processing apparatus 34 has access in at least one method step of the method. By way of example, the database characteristic may be an occurrence probability of a characteristic of at least one region of digital images of objects 10 stored in the memory unit 30, an arrangement of colors in individual regions of digital images of objects 10 stored in the memory unit 30, an arrangement of text in individual regions of digital images of objects 10 stored in the memory unit 30, an arrangement of a machine-readable character code 32 in individual regions of digital images of objects 10 stored in the memory unit 30 or another characteristic appearing expedient to a person skilled in the art. By way of example, a probability of a deviation from characteristics in the vicinity of a central point of an image stored in the memory unit 30 is small such that, for example, a pitch of the grid 24 is set to be wider in the vicinity of the central point 26 of the at least one image portion 14, 16, 18 of the image 42 of the object 10 to be scanned than in the edge region 28 of the at least one image portion 14, 16, 18 of the image 42 to be scanned. Moreover, it is also conceivable, for example, that an occurrence probability for a characteristic embodied as a color value with a value for "gray" is low in the vicinity of a central point of an image stored in the memory unit 30, and so digital scanning 12 of the at least one image portion 14, 16, 18 of the image 42 of the object 10 to be scanned is prioritized for points 44, 46 with a "gray" color value in the vicinity of the central point 26 in order to facilitate a fast reduction of possible hits or a fast assignment to an image which is stored in the memory unit 30, for the purposes of identifying the object 10.

Preferably, the transfer 58 of the digitally captured points 44, 46 from the mobile apparatus 36 to the data processing apparatus 34 occurs in time after the digital scanning 12 and/or after the digital capture 20 of the individual points 44, 46, for the purposes of further processing, in particular for the purposes of an evaluation 80, by the data processing apparatus 34. The digitally captured points 44, 46 are encrypted in at least one method step of the method, in particular prior to a transfer 58 to the data processing apparatus 34. The digitally captured points 44, 46 are encrypted at least by means of an encryption standard according to a secure hash algorithm 1 (SHA_1). However, it is also conceivable that the digitally captured points 44, 46 are encrypted by means of another encryption standard appearing expedient to a person skilled in the art, such as e.g. a future version of the encrypted standard according to a secure hash algorithm, or that the digitally captured points 44, 46 are encrypted by means of a plurality of encryption standards.

A plurality of individual digitally captured points 44, 46 are collected prior to the transfer 58 of the digitally captured points 44, 46 to the data processing apparatus 34, in particular the external data processing apparatus 34, in at least one method step of the method. Preferably, a plurality of individual digitally captured points 44, 46 are collected in the presence of a high-speed data connection since a large amount of data is transferable within a short time interval in the case of a high speed, with a small amount of data being transferable during the same time interval in the case of a lower speed of a data connection. Preferably all points 44, 46 of the image 42 are digitally captured and collected prior to the transfer 58 to the data processing apparatus 34, in particular if a high-speed data connection is present, in at least one method step of the method. In at least one method step of the method, the transfer 58 of digitally captured points 44, 46 to the data processing apparatus 34, in particular the external data processing apparatus 34, occurs directly following the digital capture 20 of each individual digitally captured point 44, 46. An individual data string of a digitally captured point 44, 46 has a size of a few kilobytes. Advantageously, the transfer 58 may take place at least substantially in real time, with, advantageously, processing of the digitally captured points 44, 46 by the data processing apparatus 34 being able to be carried out at least substantially in real time in order to facilitate a fast identification and/or a fast classification of the object 10. A selection in respect of the direct transfer 58 or the collection of digitally captured points 44, 46 is preferably controlled and/or regulated dependent on the speed of the data connection between the mobile apparatus 36 and the external data processing apparatus 34, in particular the external data processing apparatus 34. A calculation of a ratio between a speed of a data connection and a size and/or a number of items of digital data generated by the digital capture 20 is also conceivable. A number of items and/or a size, in particular a data size, of digital data is/are controlled and/or regulated dependent on the speed of a data connection between the mobile apparatus 36 and the data processing apparatus 34, in particular the external data processing apparatus 34. Preferably, the digital capture 20 of individual points 44, 46 is carried out at least substantially at the same time as the digital scanning 12, with the transfer 58 of individual digitally captured points 44, 46 from the mobile apparatus 36 to the data processing apparatus 34 being able to be carried out directly following the digital capture 20 in time. Advantageously, there may be processing of data at least largely in real time. If a data connection between the mobile apparatus 36 and the data processing apparatus 34, in particular the external data processing apparatus 34, has a speed of more than 1 MBit/s, there is a transmission of the entire image 42 of the at least one object 10 to be identified, in particular in addition to the transfer 58 of individual captured points 44, 46. When transmitting the entire image 42, all points 44, 46 of the image 42 may have previously be captured digitally by means of the mobile apparatus 36, wherein, preferably, a digital photo of the object 10 was captured with the mobile apparatus 36, said digital photo being transferred to the data processing apparatus 34, in particular the external data processing apparatus 34. Preferably, by means of the data processing apparatus 34, in particular the external data processing apparatus 34, the transferred data are matched with data which are stored in the memory unit 30 and/or to which the data processing apparatus 34 has access. Matching is carried out in at least one method step of the method dependent on a correspondence of at least one color value and at least one coordinate of captured points 44, 46 with points which are stored in the memory unit 30 and/or to which the data processing apparatus 34 has access. An identification and/or a classification of the object 10 may be performed on the basis of this matching. If a correspondence emerges from matching at least one color value and at least one coordinate of captured points 44, 46 and stored points, the method is completed and a result is presented to an operator. If there is no correspondence, further method steps of the method are preferably run through.

The digital capture 20 of individual points 44, 46 of the image 42 is carried out dependent on an identification of the machine-readable character code 32, in particular a barcode and/or a QR code, in the at least one image portion 14, 16, 18 of the image 42 (FIG. 2) in at least one method step of the method. The digital capture 20 of points 44, 46 is ceased if the machine-readable character code 32, in particular a barcode and/or a QR code, is identified and the machine-readable character code 32 is read. By way of example, if the machine-readable character code is identified in the edge region 28 and/or in the background of the at least one image portion 14, 16, 18 of the image 42, the digital capture 20 of points 44, 46 is continued, in particular in accordance with the method steps described previously. By way of example, if the machine-readable character code 32 is identified in the vicinity of the central point 26 and/or in the foreground of the at least one image portion 14, 16, 18 of the image 42, the digital capture 20 of points 44, 46 is ceased and the machine-readable character code 32 is read. Advantageously, a dynamic adaptation of the method may be carried out when identifying the machine-readable character code 32. Advantageously, a fast identification and/or fast classification of the object 10 may be facilitated. The read machine-readable character code 32 is transferred to the data processing apparatus 34 for matching purposes. If a machine readable character code 32, in particular a barcode and/or a QR code, is identified and if there is a correspondence with machine-readable character code which is stored in the memory unit 30 and/or to which the data processing apparatus 34 has access, the method is completed and a result is presented to an operator. If no correspondence emerges, further method steps of the method of preferably run through.

Text scanning 74 for finding text present on the object 10 is carried out in at least one method step of the method. Preferably, the at least one image portion 14, 16, 18 of the image 42 is preprocessed, in particular by means of the mobile apparatus 36, at least before carrying out the text recognition, in particular by the data processing apparatus 34. Preferably, at least one contrast characteristic of the at least one digitally captured point 44, 46 is at least changed before carrying out a text recognition. Preferably, at least one color value of the at least one digitally captured point 44, 46 is changed before carrying out a text recognition, in particular during the preprocessing. In particular, at least one color value of the at least one digitally captured point 44, 46 is changed by means of a digital filter. Preferably, all color values of digitally captured points 44, 46 of the at least one image portion 14, 16, 18 of the image 42 are converted to a "black" or "white" color value before carrying out the text recognition. In particular, the color value is converted dependent on a comparison of a color value of a digitally captured point 44, 46 with a threshold stored in a database, in particular the memory unit 30, of the data processing apparatus 34. Preferably, there is a change in at least one contrast characteristic of the at least one digitally captured image portion 14, 16, 18, at least in part of the at least one image portion 14, 16, 18 of the image 42. Particularly preferably, the use of a digital filter function for the at least one whole image portion 14, 16, 18 of the image 42 is determined on the basis of the change in contrast in the at least one part of the at least one image portion 14, 16, 18 of the image 42. In particular, a size of at least one individual letter, stored in the database of the data processing apparatus 34, is used in respect of the size, to be selected, of the at least one part of the at least one image portion 14, 16, 18 of the image 42. The at least one preprocessed image portion 14, 16, 18 of the image 42 is transferred to the data processing apparatus 34. Preferably, digital text recognition is carried out by means of the data processing apparatus 34, in particular the external data processing apparatus 34. If the text recognition is successful and if the identified text may be assigned to an object 10 stored in the memory unit 30 or to an object 10, to which the data processing apparatus 34 has access, for example by way of an Internet connection, the method is completed and a result is presented to an operator. If there is no text recognition or there is no assignment, further method steps of the method are preferably run through.

At least one edge profile of the image 42 of the at least one object 10 to be identified is captured digitally 20 in at least one method step of the method. Preferably, 3D data, in particular 3D-CAD data, of objects 10 is stored in the memory unit 30, it being possible to compare said data with the digitally captured edge profiles. In particular, at least a contour of the object 10 is captured by the digital capture 20 of at least one edge profile. A digital information item of the edge profile is transferred to the data processing apparatus 34 for matching purposes. A form of the object 10 may be captured by means of the digital capture 20 of the edge profile. A classification and/or an identification of the object 10 may be facilitated on the basis of the captured form. If there is a correspondence between the captured edge profile and an edge profile which is stored in the memory unit 30 and/or to which the data processing apparatus 34 has access, the method is completed and a result is presented to an operator. If there is no correspondence, further method steps of the method are preferably run through.

A size and/or an arrangement of the at least one image portion 14, 16, 18 of the image 42 to be scanned digitally are/is predetermined by an operator in at least one method step of the method. The mobile apparatus 36 comprises the touch-sensitive input unit 64 for the purposes of selecting the at least one image portion 14, 16, 18 of the image 42 by an operator, said input unit having a selection mask 66 for selecting the at least one image portion 14, 16, 18 of the image 42, the size of which is modifiable by means of at least one finger of the operator (FIG. 2). Particularly preferably, a size and/or an arrangement of the at least one image portion 14, 16, 18 of the image 42 to be scanned is predetermined by a operator by means of the touch sensitive input unit 64, in particular after digitization by means of the image sensor 70. By way of example, a operator may predetermine that the digital scanning 12 of the image 42 only takes place in at least one part of the image 42 having text. Further, it is conceivable, for example, that an operator adapts the size of the scanning window to a size of writing arranged on the object 10, graphics arranged on the object 10 or the like. Further prescriptions of the size and/or an arrangement of the at least one image portion 14, 16, 18 of the image 42 to be scanned which appear expedient to a person skilled in the art are likewise conceivable.

At least one global location characteristic and/or at least one weather characteristic are/is taken into account in at least one method step of the method during a comparison of digitally captured points 44, 46 of the image 42 with data of images of objects 10 which are stored in the memory unit 30 or to which the data processing apparatus 34 has access. In at least one method step of the method, operator data are taken into account in the comparison of digitally captured points 44, 46 of the image 42 with data of images 42 of objects 10 which are stored in the memory unit 30 or to which the data processing apparatus 34 has access. By way of example, the operator data may be an education state, a place of work type (carpenter's workshop, steel construction, house construction, vehicle construction, vehicle service or the like), an identification search query behavior, login data, personal data and/or further operator data appearing expedient to a person skilled in the art.

An operator input in respect of the type of an object 10 to be identified is taken into account in at least one method step of the method. An acceleration characteristic and/or an alignment characteristic of the mobile apparatus 36 are/is taken into account in at least one method step of the method. The mobile apparatus 36 comprises at least one alignment sensor 60 and/or acceleration sensor 62, the data captured thereby being processable by the external data processing apparatus 34 for the purposes of identifying the object 10. Furthermore, it is conceivable that further data and/or characteristics appearing expedient to a person skilled in the art are taken into account when identifying the object 10. Moreover, it is conceivable that additional information items, such as e.g. offered accessories for the identified object 10, warranty expiry dates for the identified object 10, expansion suggestions for machinery or the like, may be output dependent on the identified object 10 in at least one method step of the method.

Instructions are output to an operator in at least one method step of the method, said instructions at least comprising movement instructions for moving a mobile apparatus 36 provided for digitally capturing 20 digital points 44, 46 of the image 42, relative to the object 10 to be identified. By way of example, it is conceivable that there is an output to an operator to carry out a movement of the mobile apparatus 36 around the object 10 to be identified in order, in particular, to identify text extending around the object 10 or in order to capture the shape of the object 10, in particular the three-dimensional shape. Moreover, it is conceivable, for example, that there is an output to an operator to carry out a movement of the mobile apparatus 36, relative to the object 10 to be identified, along a longitudinal axis of the object 10 to be identified in order to capture a maximum dimension of the object 10. Further, it is for example conceivable that there is an output to an operator to carry out a movement of the mobile apparatus 36, relative to the object 10 to be identified, along a direction extending at least substantially across a longitudinal axis of the object 10 to be identified in order to generate a depth information item in respect of the object 10 to be identified. Further outputs, appearing expedient to a person skilled in the art, to an operator to move the mobile apparatus 36 relative to the object 10 to be identified are likewise conceivable.

Figure 4:
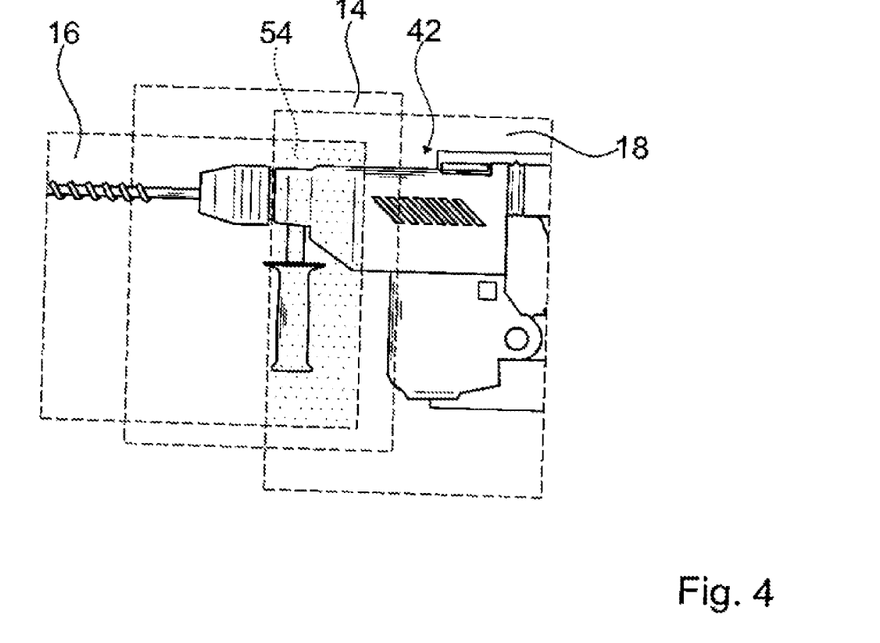
FIG. 4 shows a detailed view of a superposition of image portions for identifying objects by means of a method according to the disclosure, in a schematic illustration.
Figure 5:
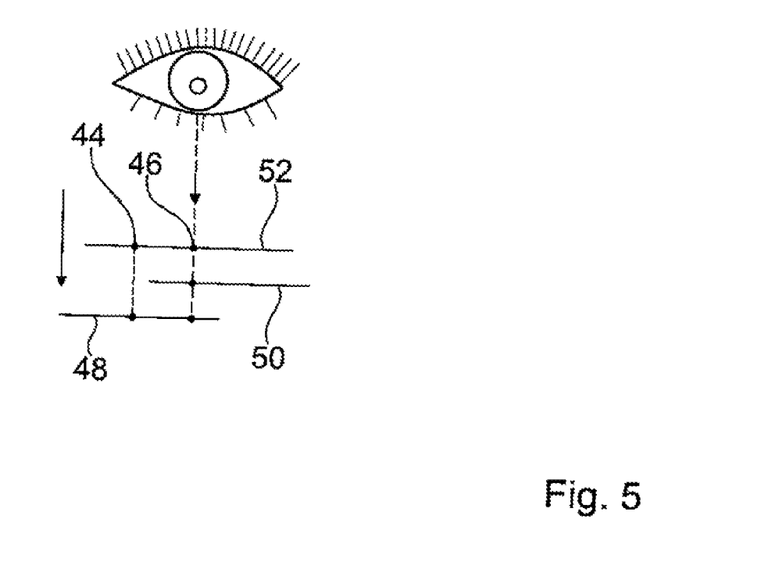
FIG. 5 shows a superposition of image data records of the image portions from FIG. 4 for identifying objects by means of a method according to the disclosure, in a schematic illustration.

The digitally captured points 44, 46 of the at least one image portion 14, 16, 18 of the image 42 are combined to form an image data record 48, 50, 52 in at least one method step of the method, with a plurality of image data records 48, 50, 52 being generated for an object 10 to be identified, said image data records differing from one another at least in view of at least one image portion characteristic (FIGS. 4 and 5). Preferably, the image data records 48, 50, 52 differ at least in an image portion characteristic embodied as a scanning and/or capture angle. By way of example, for the purposes of digitally scanning 12 the at least one image portion 14, 16, 18 and/or for digitally capturing 20 individual points 44, 46, an operator holds the mobile apparatus 36 over the object 10 to be identified, wherein, as a consequence of muscular movements, in particular involuntary muscular movements, of the operator, minimal movements of the mobile apparatus 36 are caused relative to the object 10 to be identified, leading to different scanning and/or capture angles. In particular, individual image portions 14, 16, 18 of an image 42 are stored, at least temporarily, by means of the mobile apparatus 36 for digital scanning 12 and/or digital capture 20 of individual points 44, 46. The image data records 48, 50, 52 are superposed in at least one method step of the method. A new color value, in particular a "transparent" color value, is assigned to the digitally captured points 44, 46 of the image data records 48, 50, 52, in particular to the digitally captured points 44, 46 of the image data records 48, 50, 52 which have a "white" color value, at least during or prior to a superposition of the image data records 48, 50, 52. In particular, mirroring surfaces of the object 10 to be identified and/or plastic packaging, which generates light reflections, can be generated as digitally captured points 44, 46 of the image 42 which have a "white" color value in the case of the digital capture 20. In particular, new color values, in particular a "transparent" color value, are assigned to these digitally captured points 44, 46 prior to or during a superposition. At least one new image portion 54 (depicted by dots in FIG. 4) of an image 42 of the at least one object 10 to be identified is calculated from the superposition of the image data records 48, 50, 52. Preferably, a new image data record is generated for the new image portion 54. By way of example, if a point 46 with the coordinates (4/7) and a "blue" color value is captured in one of the image data records 48, 50, 52 and points with the "white" color value are captured at the coordinates (4/7) in the further image data records 48, 50, 52, with the "transparent" color value being assigned to said points prior to or during the superposition, then the "blue" color value can unambiguously be assigned to the position with the coordinates (4/7) in the newly calculated image portion 54 as a consequence of a superposition of the image data records 48, 50, 52.

The individual method steps of the method for identifying the object 10 may run with a time offset or at the same time. The sequence of the individual method steps of the method is preferably dependent on digitally captured information items, dependent on operator inputs and dependent on commands which are output to the mobile apparatus 36 from the data processing apparatus 34.

What is claimed is:

1. A method for identifying three-dimensional objects, the method comprising:
    generating a plurality of image data records for an object to be identified, each image data record corresponding to a respective image portion of an image of an object to be identified, each respective image portion being different at least with respect to at least one image portion characteristic, the generating of each image data record comprising:
        digitally scanning the respective image portion to digitally capture points of the respective image portion of the image, only a subset of all points in the respective image portion being digitally captured; and combining the digitally captured subset of all points of the respective image portion of the image to form the image data record;

generating a superposition of the plurality of image data records; and assigning a transparent color value to the digitally captured subset of all points which have a white color value in the superposition of the plurality of image data records.

2. The method according to claim 1, further comprising:
calculating, based on the superposition of the image data records, at least one new image portion of an image of the object to be identified.

3. The method according to claim 1, the digital scanning further comprising:
digitally capturing the points of the respective image portion at least dependent on a deviation of at least one characteristic of at least two of the individual points, the deviation being at least one of:
a deviation of at least one characteristic of the point captured most recently in relation to a characteristic of at least one other of the points to be captured digitally,
a deviation of at least one color value of the at least two of the points, and
a deviation of at least one brightness value of the at least two of the points.

4. The method according to claim 1, the digital scanning further comprising at least one of:
digitally scanning the image along an image direction of the respective image portion of the image, the image direction extending diagonally; and
digitally capturing the points of the image along the image direction of the respective image portion of the image, the image direction extending diagonally.

5. The method according to claim 1, wherein a grid is for at least one of (i) the digital scanning of the respective image portion of the image and (ii) the digital capture of the points of the respective image portion.

6. The method according to claim 5, wherein at least one of:
the method further comprises modifying at least one characteristic of the grid dependent on at least one characteristic of the respective image portion of the image; and
a pitch of the grid in the vicinity of a central point of the at least one image portion of the image is narrower than in an edge region of the respective image portion of the image.

7. The method according to claim 1, the digital scanning further comprising:
digitally capturing points with a smaller deviation from at least one characteristic in a vicinity of a central point of the respective image portion of the image than in an edge region of the respective image portion of the image.

8. The method according to claim 1, further comprising:
predetermining, by an operator, at least one of a dimension and an arrangement of the respective image portion of the image to be digitally scanned.

9. The method according to claim 1, further comprising:
comparing the digitally captured subset of all points of the image with data of images of objects which are stored in a memory unit, the comparing taking into account at least one of at least one global location characteristic and at least one weather characteristic.

10. The method according to claim 1, wherein an operator input with respect to a type of object to be identified is taken into account in at least one method step.

11. The method according to claim 1, wherein the digital scanning of the respective image portion of the image is performed using of a mobile apparatus which is connected to an external data processing apparatus and configured to transfer digital data to the external data processing apparatus.

12. The method according to claim 11, wherein at least one of an acceleration characteristic and an alignment characteristic of the mobile apparatus is taken into account in at least one method step.

13. The method according to claim 11, further comprising:
preprocessing the respective image portion of the image using a computing unit of the mobile apparatus.

14. The method according to claim 1, further comprising:
outputting instructions to an operator, the instructions at least comprising movement instructions for moving a mobile apparatus configured to capture digital points of the image relative to the object to be identified.

15. A system for identifying three-dimensional objects, the system comprising:
at least one mobile apparatus configured to generate a plurality of image data records for an object to be identified, each image data record corresponding to a respective image portion of an image of the object to be identified, each respective image portion being different at least with respect to at least one image portion characteristic, the at least one mobile apparatus being configured to:
generate each image data record by:
digitally scanning the respective image portion to digitally capture points of the respective image portion of the image, only a subset of all points in the respective image portion being digitally captured; and
combining the digitally captured subset of all points of the respective image portion of the image to form the image data record, the at least one mobile apparatus having at least one collective logic configured to digitally capture the points of the respective image portion;
generate a superposition of the plurality of image data records; and
assign a transparent color value to the digitally captured subset of all points which have a white color value in the superposition of the plurality of image data records; and
at least one data processing apparatus in communication with at least the mobile apparatus, the least one data processing apparatus being configured to identify the object by processing the digitally captured subset of all points of the superposition of the plurality of image data records.

16. The system according to claim 15, the mobile apparatus comprising:
at least one of at least one alignment sensor and an acceleration sensor configured to capture data that is processed by the data processing apparatus in order to identify the object.

17. The system according to claim 15, the mobile apparatus comprising:

a touch-sensitive input unit configured to receive a selection from an operator of the respective image portion for at least one image data record in the plurality of image data records, the input unit having a selection mask configured for selecting the respective image portion of the image, a size of the selection mask being modifiable using at least one finger of the operator.

18. The system according to claim 15, wherein the data processing apparatus is embodied as at least one server.

* * * * *